Patented Apr. 26, 1949

2,468,605

UNITED STATES PATENT OFFICE 2,468,605

DIAMINO DIANTHRIMIDE ACRIDONES

Mario Scalera, Somerville, and Asa W. Joyce, Plainfield, N. J., assignors to American Cyanamid Company, New York, N. Y., a corporation of Maine No Drawing. Application November 28, 1944, Serial No. 565,574

5 Claims. (Cl. 260—276)

This invention relates to new diamino dianthrimide acridones.

The products of the present invention are derivatives of 1,1'-dianthrimide-2,2'-acridone or 1,2'-dianthrimide 2,1'-acridone having the respective formulas:

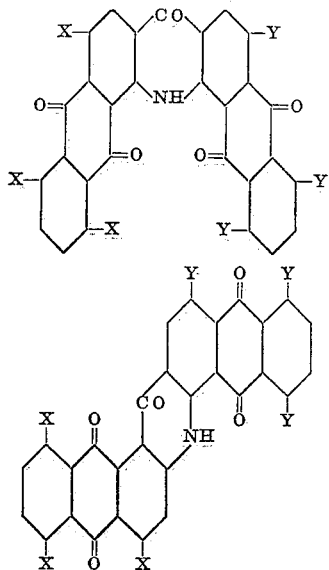

X and Y being selected from the group consisting of hydrogen, amino, and acylamino radicals, at least one X and one Y being amino or acylamino.

Throughout the specification and claims the term "acyl" will be used in its more limited sense as meaning the acid radical of a carboxylic acid. It will have no other meaning.

The products of the present invention are vat dyestuffs which dye cellulosic fibers from violet vats brown to gray to olive shades of excellent properties of fastness.

While the present invention is not limited to any particular process, we have found one method which is particularly effective for the preparation of our diamino dianthrimide acridones. This method consists in the ring closure of diacylamino dianthrimides bearing a carboxy or cyano group ortho to the imino linkage by heating in concentrated sulfuric acid. This method gives the desired diamino dianthrimide acridones in a good state of purity; if desired, the amino groups may be acylated in the conventional manner to give the diacylamino dianthrimide acridones.

The carboxy (or cyano) dianthrimides used as intermediates may be prepared by any of the processes known to the art for the preparation of acylamino dianthrimides, such as by reduction of the appropriate dinitro dianthrimide followed by acylation, or by the interaction of a mono-acyl diamino anthraquinone with a mono-acylamino ortho carboxy (or ortho cyano) halogen anthraquinone.

The products of our invention may be purified, is so desired, by well known chemical procedures, such as crystallization from high boiling organic solvents, fractional precipitation of their sulfates from sulfuric acid, and the like. In the case of the diacylamino compounds, treatment of a finely divided aqueous suspension of the dyestuff with an oxidizing agent, such as sodium hypochlorite or sodium dichromate, has been found quite effective.

It is an advantage of the present invention that a wide variety of acyl groups may be present, such as, for example, acetyl, chloro acetyl, benzoyl, halogenated benzoyl, naphthoyl, and the acid radicals of anthraquinone carboxylic acids and pyridine and furane carboxylic acids.

The present invention will be described in greater detail in conjunction with the following examples, the parts being by weight.

Example 1

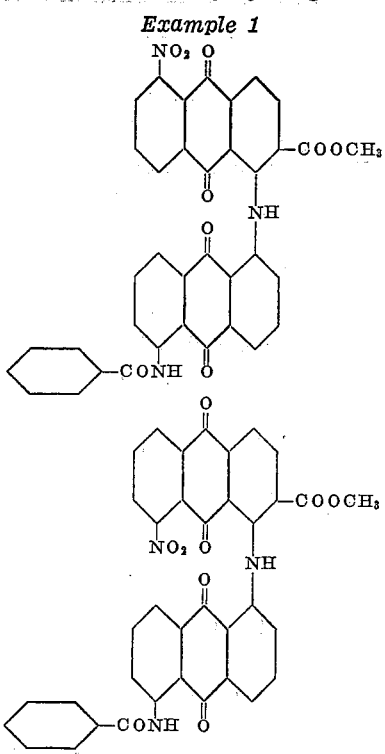

118 parts of mixed 5 and 8-nitro-1-chloroanthraquinone-2-carboxy methyl ester (prepared by the esterification of mixed 5 and 8-nitro-1-chloro-anthraquinone-2-carboxylic acid with mono methyl sulfuric acid), 117 parts 1-amino-5-benzoylamino anthraquinone, 33 parts sodium carbonate and 9.0 parts cuprous chloride are introduced into 900 parts nitrobenzene and the mass stirred at about 180° for 8 hours. 600 parts nitrobenzene are then added and after cooling to about 30°, filtered and washed with nitrobenzene and alcohol. After it is slurried in dilute sulfuric acid, filtered, washed free of acid and dried, it is a dark red-brown substance dissolving in conc. sulfuric acid with an olive-brown color, turning green on careful dilution with water.

*Example 2*

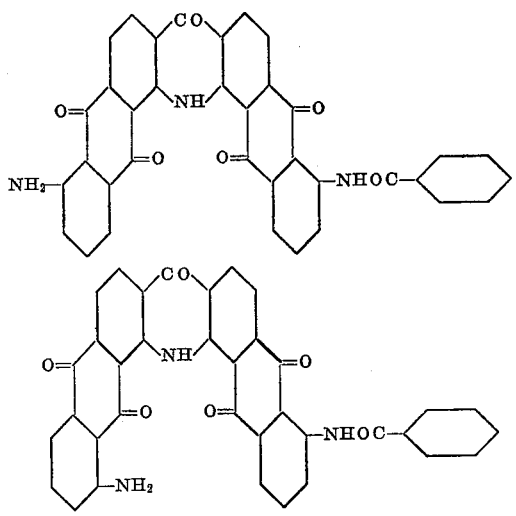

26 parts of mixed 5 and 8-nitro-5'-benzoylamino - 1,1' - dianthrimide - 2 - carboxy methyl ester (prepared as described in Example 1), are dissolved in 520 parts sulfuric acid of 98% strength at 15-20°, then drowned in 2500 parts water, filtered and washed free of acid. The neutral filter cake is slurried in 1500 parts water, 60 parts sodium hydroxide and 67 parts sodium hydrosulfite are added and the mass stirred at 60-65° for one hour when the formation of a vat of the reduced acridone is substantially completed. The vat is now aerated until complete separation is obtained, filtered and washed free of alkali. After drying, it is a dark brown body which may be purified by recrystallizing from nitrobenzene.

*Example 3*

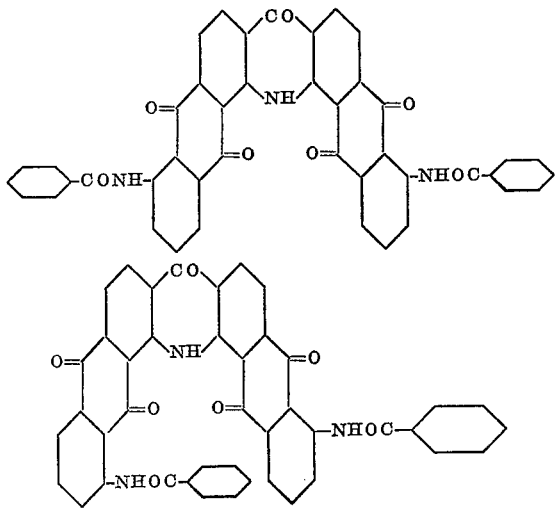

7.0 parts of mixed 5- and 8-amino-5'-benzoylamino-1,1'-dianthrimide acridone (prepared as described in Example 2), 3 parts of benzoyl chloride and 1.0 part pyridine are introduced into 100 parts nitrobenzene and the mass stirred at 190-200° for 2-3 hours. After cooling, the seprated dyestuff is filtered, washed with nitrobenzene and alcohol and dried. It is a dark brown body dissolving in conc. sulfuric acid with a brown color and dyeing cotton an orange-brown shade from a violet vat. Its shade is considerably brightened by an oxidation treatment with sodium hypochlorite.

*Example 4*

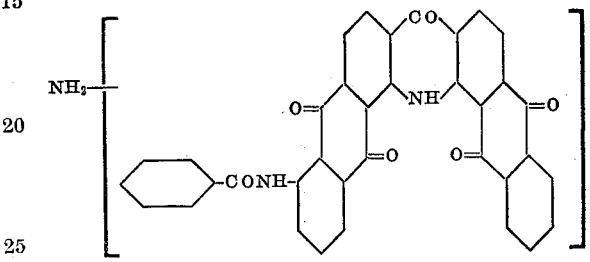

5-benzoylamino-1,1'-dianthrimide acridone is prepared by reacting 1 mole of 1-benzoylamino-5-amino anthraquinone with 1 mol. of 1 chloroanthraquinone-2-carboxylic acid benzyl ester in nitrobenzene solution using sodium carbonate as an acid binding agent, sodium acetate as a buffer and a small amount of cuprous chloride as a catalyst. The ester of 5-benzoylamino-1,1'-dianthrimide-2'-carboxylic acid produced is hydrolyzed with caustic potash in aqueous alcohol in the presence of pyridine, followed by neutralization of the sodium salt of the dianthrimide carboxylic acid with hydrochloric acid. The benzoylamino 1,1'-dianthrimide-2' - carboxylic acid is then heated in nitrobenzene solution with a small amount of benzoylchloride as a catalyst, cooled to 90° C. and the ring closure completed with sulfuric acid at 105 to 110° C.

73 parts of the 5-benzoylamino-1,1'-dianthrimide acridone obtained are dissolved in 1500 parts of concentrated sulfuric at 10–15° C. This solution is then cooled to 0° C. and a mixed acid comprising 13 parts nitric acid (70%) and 185 parts concentrated sulfuric is gradually added during the course of about two hours at 0° to +2° C. The nitration mixture is then stirred 2 hours longer, slowly warming up to about 20° C., then drowned in 6000 parts water, filtered and washed acid free. The orange-brown filter cake is slurried in 2000 parts of water and 28 parts sodium sulfide (100%) added, then heated to 90–95° C. and held at this temperature for about 2 hours, filtered, washed free of alkali and dried. The yield is nearly quantitative.

*Example 5*

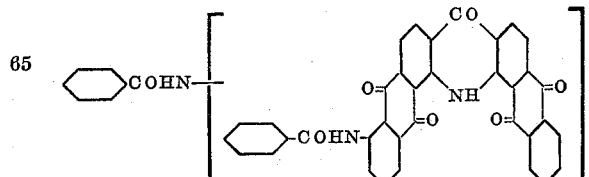

72 parts of amino-5-benzoylamino-1,1'-dianthrimide acridone (prepared as described in Example 4), 28 parts benzoyl chloride and 8 parts pyridine are introduced into 900 parts nitrobenzene, and the mass stirred at 200–205° C. for about 3 hours. After cooling to room temperature, a Bordeaux brown substance is obtained by filtration and washing with nitrobenzene and alcohol. It dissolves in conc. sulfuric acid with an orange color and dyes cotton strong Bordeaux red shades of excellent fastness. A treatment with an oxidizing agent, such as sodium hypochlorite or sodium dichromate increases its brightness.

*Example 6*

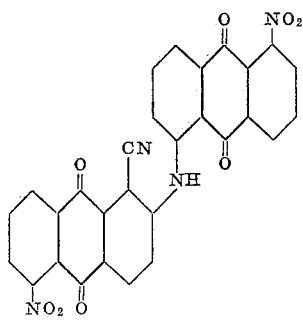

141 parts of 1-cyano-2-bromo-5-nitro anthraquinone (prepared by a Sandmeyer reaction on 1-diazo-2-bromo-5-nitro anthraquinone), 107 parts of 1-amino-5-nitro anthraquinone, 68 parts of anhydrous sodium acetate and 8 parts of cuprous chloride are introduced into 720 parts of nitrobenzene. The whole mass is then stirred at about 205° C. for 8-9 hours. After cooling the reaction mass to room temperature, it is filtered, washed with nitrobenzene and finally with alcohol. The dark brown substance so obtained is slurried in about 1000 parts water and 200 parts conc. hydrochloric acid at about 60° C., filtered, washed acid-free and dried. It is a dark brown body soluble in conc. sulfuric acid with a brown violet color. It dissolves in an alkaline hydrosulfide vat with a brown color.

*Example 7*

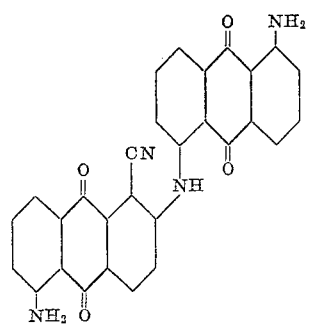

173 parts 5,5'-dinitro-1-cyano-2,1'-dianthrimide (prepared as described in Example 6), are dissolved in 4500 parts conc. sulfuric acid at room temperature. This solution is then poured into 16000 parts cold water, filtered and washed acid-free. The filter cake is slurried in about 5000 parts of water, made faintly alkaline to brilliant yellow with sodium carbonate, and 67 parts of sodium hydrosulfide added. The slurry is stirred at about 90-95° C. for 2-3 hours, filtered and washed alkali free. The diamino compound is obtained in excellent yield and is a violet-brown body dissolving in conc. sulfuric acid with a Bordeaux red color. It is an intermediate product useful for the preparation of valuable vat dyestuffs.

*Example 8*

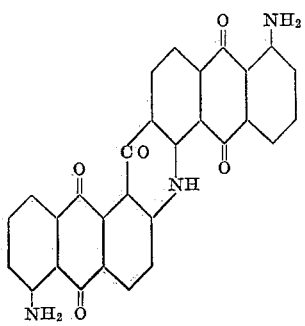

131 parts of 5,5'-diamino-1-cyano-2,1'-dianthrimide (prepared as described in Example 7), are introduced into 2000 parts of sulfuric acid of 96% strentgh and then heated up to 125-130° C. and held at this temperature for about 3 hours. The color of the sulfuric acid changes from a Bordeaux red to an orange-brown. After cooling to about 30° C. water is added until the concentration of sulfuric acid has been reduced to about 55%. The temperature is not allowed to rise above about 85° C. The separated acridone is filtered off and washed with 55% sulfuric acid and finally with water until it is acid-free. It is a dark brown body dissolving in the hydrosulfite vat with a violet-blue color, and in conc. sulfuric acid with a brown color.

*Example 9*

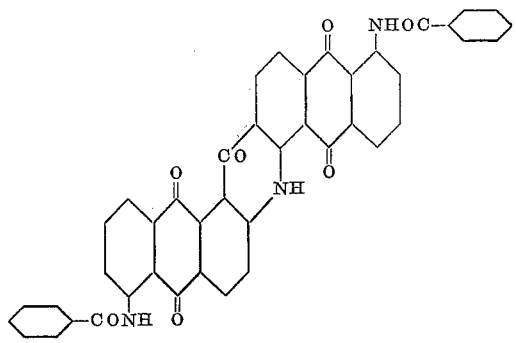

25 parts of 5,5'-diamino-2,1'-dianthrimide acridone (prepared as described in Example 8), 21 parts benzoyl chloride and 2.0 parts pyridine are introduced into 600 parts nitrobenzene and the mass stirred at about 190-200° C. for 2-3 hours. After cooling to room temperature, the separated dibenzoylamino-2,1'-dianthrimide acridone is filtered, washed with alcohol and dried. It is a dark brown body, dissolving in conc. sulfuric acid with a brown color. It dyes cotton a strong orange-brown shade from a blue-violet vat. Its shade is considerably brightened by a treatment with an oxidizing agent, such as sodium hypochlorite or sodium dichromate.

*Example 10*

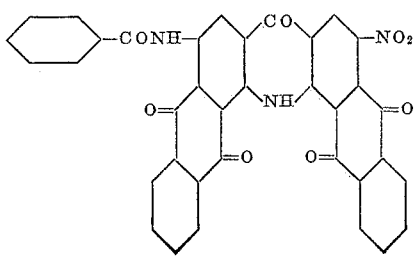

58 parts of 4-benzoylamino-1,1'-dianthrimide-2,2'-acridone (obtainable by the benzoylation of 4-amino-1,1'-dianthrimide-2,2'-acridone, which may be prepared by reducing the nitration product of 1,2,7,8-diphthaloyl acridone), are dissolved in 1200 parts concentrated sulfuric acid at 10–15° C. 140 parts of a mixed acid having a nitric acid content of 49.5% are gradually added during about two hours at 10–15° C. After stirring 2–3 hours at 15–18° C., the nitration mixture is drowned, filtered and washed free of acid. The yield is theoretical for a mono nitro compound.

*Example 11*

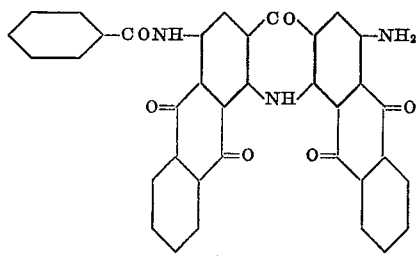

35 parts of 4-benzoylamino-4'-nitro-1,1'-dianthrimide-2,2'-acridone (prepared as described in Example 10), are dissolved in 500 parts conc. sulfuric acid at 20° C., drowned in 2500 parts water, filtered and washed free of acid. The filter cake is slurried in 1000 parts of water at about 50° C., 4.5 parts sodium hydroxide and 5.6 parts of sodium hydrosulfide are added. The mixture is stirred and heated about 2 hours at 90–95° C., filtered and washed free of alkali. The amino compound thus obtained is a dark body dyeing cotton a blue-gray shade from a reddish vat.

*Example 12*

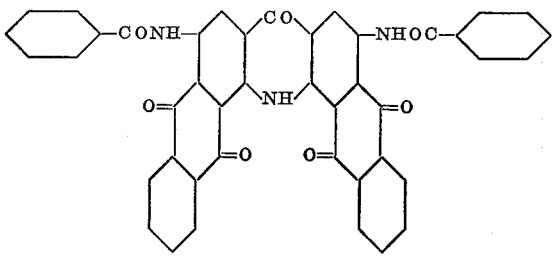

27 parts of 4-benzoylamino-4'-amino-1,1'-dianthrimide-2,2'-acridone (prepared as described in Example 11), 14 parts benzoyl chloride and 4 parts pyridine are introduced into 600 parts nitrobenzene, and the mass is agitated at about 200° C. for 3 to 4 hours. After cooling, the separated reaction product is filtered and washed with nitrobenzene and alcohol. The yield of dibenzoylamino body is excellent. It dissolves in the vat with a Bordeaux red color from which cotton is dyed strong reddish-gray to black shades of excellent fastness.

We claim:
1. Diamino dianthrimide acridones selected from the group consisting of diamino dianthrimide acridones having the formula:

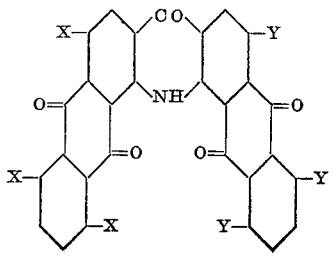

and diamino dianthrimide acridones having the formula:

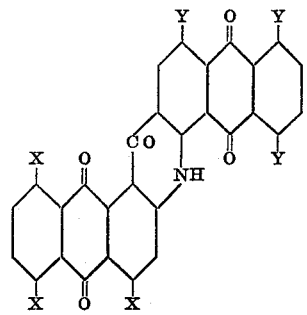

at least one X and at least one Y being a radical selected from the group consisting of amino and acylamino, the remaining atoms at these locations being hydrogen.

2. Diacylamino dianthrimide acridones selected from the group consisting of diacylamino dianthrimide acridones of the formula:

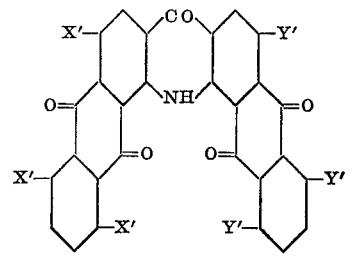

and diacylamino dianthrimide acridones of the formula:

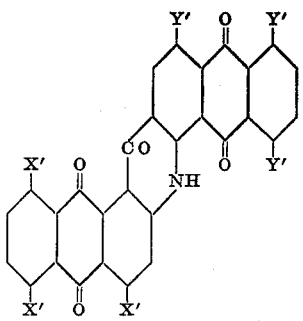

at least one X' and at least one Y' being an acylamino group, the remaining atoms at these locations being hydrogen.

3. Dibenzoylamino dianthrimide acridones selected from the group consisting of dibenzoylamino dianthrimide acridones of the formula:

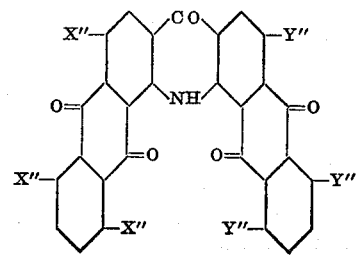

and dibenzoylamino dianthrimide acridones of the formula:

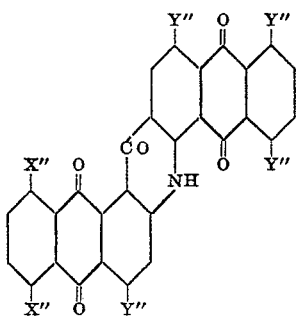

at least one X'' and at least one Y'' being a benzoylamino group, the remaining atoms at these locations being hydrogen.

4. Dibenzoylamino 1,1' - dianthrimide - 2,2' - acridones selected from the group having the general formula:

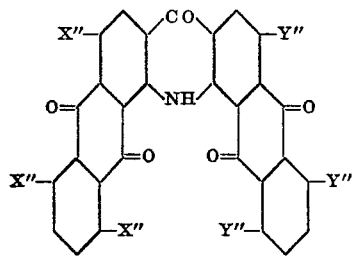

at least one X'' and at least one Y'' being a benzoylamino group, the remaining atoms of these locations being hydrogen.

5. Dibenzoylamino 1,2'-dianthrimide-2,1'- acridones selected from the group having the general formula:

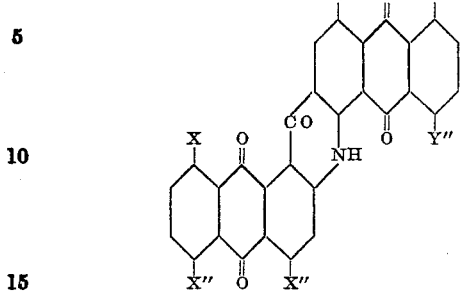

at least one X'' and at least one Y'' being a benzoylamino group, the remaining atoms at these locations being hydrogen.

MARIO SCALERA.
ASA W. JOYCE.

REFERENCES CITED

The following references are of record in the file of this patent:

UNITED STATES PATENTS

| Number | Name | Date |
|---|---|---|
| 1,696,499 | Mieg et al. | Dec. 25, 1928 |
| 1,706,933 | Mieg et al. | Mar. 26, 1929 |
| 1,709,945 | Mieg et al. | Apr. 23, 1929 |
| 1,709,993 | Mieg et al. | Apr. 23, 1929 |

FOREIGN PATENTS

| Number | Country | Date |
|---|---|---|
| 590,746 | Germany | Jan. 9, 1934 |